United States Patent [19]
Kaesser et al.

[11] 3,761,601
[45] Sept. 25, 1973

[54] REMOVABLE FLAME-PROOF POTTED FITTING

[75] Inventors: Glenda F. Kaesser, St. Louis; Marshall G. Zavertnik, Manchester, both of Mo.

[73] Assignee: Killark Electric Manufacturing Company, St. Louis, Mo.

[22] Filed: Oct. 4, 1971

[21] Appl. No.: 186,095

[52] U.S. Cl............ 174/52 R, 174/65 R, 174/151, 285/158, 285/321
[51] Int. Cl........................ H05k 5/02, H01h 9/04
[58] Field of Search.................... 174/20, 23 R, 50, 174/52 R, 52 S, 65 R, 65 SS, 76, 77 R, 86, 151; 285/158, 161, 321

[56] References Cited
UNITED STATES PATENTS
| | | | |
|---|---|---|---|
| 2,305,482 | 12/1942 | Lester............................ | 174/52 S X |
| 2,913,987 | 11/1959 | Clymer............................ | 174/86 X |
| 2,988,591 | 6/1961 | Appleton et al............. | 174/52 R X |
| 3,210,608 | 10/1965 | Appleton..................... | 174/151 UX |

FOREIGN PATENTS OR APPLICATIONS
| | | | |
|---|---|---|---|
| 1,083,777 | 9/1967 | Great Britain.................... | 285/158 |

Primary Examiner—Laramie E. Askin
Attorney—Rogers, Ezell, Eilers & Robbins

[57] ABSTRACT

A removable flame-proof potted fitting consisting of a coupling assembly for carrying wires through the wall of a box, the assembly having an outer bushing externally threaded for a flame-proof engagement into the wall of the box and having a smooth cylindrical inner surface, a cylindrical sleeve having a smooth outer surface removably slipped through the outer fitting with an engagement close and long enough to prevent passage of flame, removable retaining rings to hold the sleeve in the fitting, an elastomer gasket engageable into one end of the sleeve having openings to receive wires that extend through the sleeve, and potting compound filling the sleeve about the wires to prevent passage of flame, the sleeve with the wires being removable from the outer fitting without destroying that fitting or the potting of the wires, the bushing also being removable so that the entire device is removable easily as an entirety.

8 Claims, 6 Drawing Figures

PATENTED SEP 25 1973 3,761,601
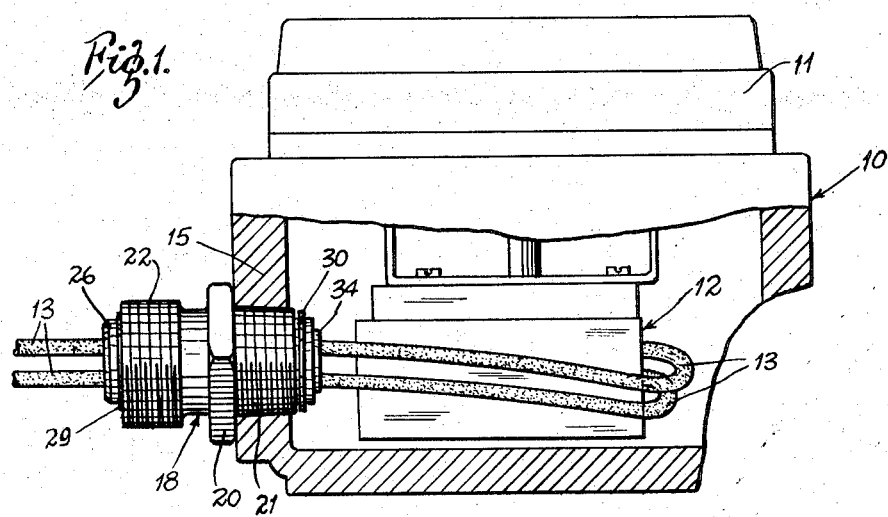
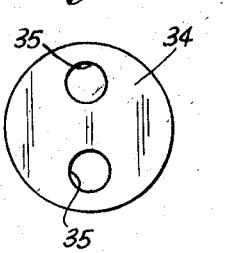
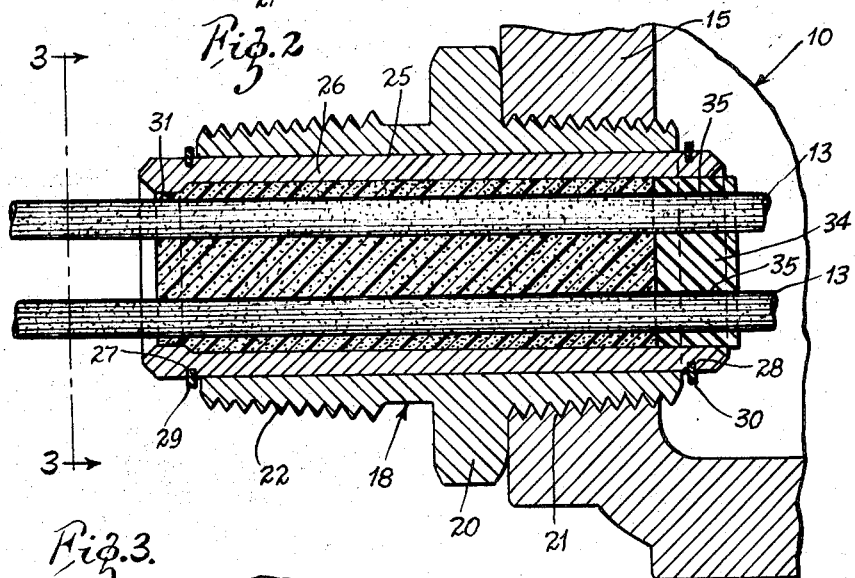
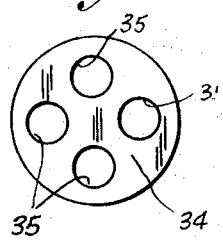
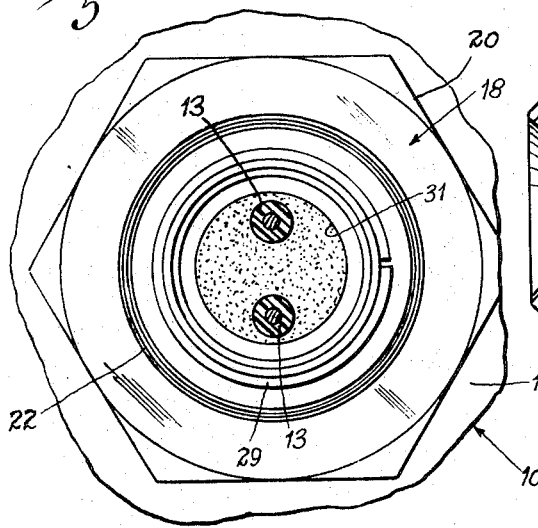
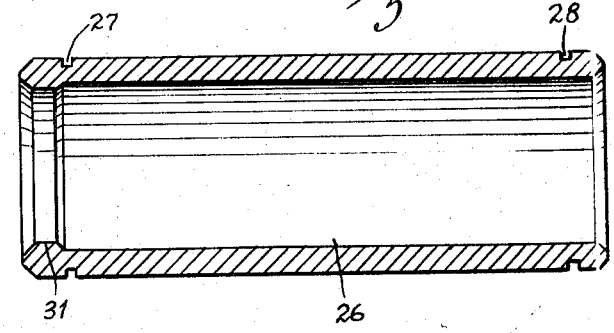
INVENTORS:
GLENDA F. KAESSER
MARSHALL G. ZAVERTNIK
BY Rogers, Ezell, Eilers & Robbins
ATTORNEYS

REMOVABLE FLAME-PROOF POTTED FITTING

BACKGROUND AND FEATURES OF THE INVENTION

Heretofore, to conduct wires or the like from inside to outside of a box without providing a flame path has required potting the wires into a fixture mounted in the wall of the box. When the wires had to be removed for any reason, the potting was destroyed and had to be recast, which is in violation of the National Electrical Code. Therefore, to remove a device which was potted in and comply with the Code, it was necessary to take down the electrical installation and to replace it with new conduit, seal-offs, wire, etc.

With the present invention, the wiring can be installed and removed from the box with ease. This is arranged by having a wiring sub-assembly in the form of a sleeve through which the wires extend and in which they are sealed by a potting compound. The sleeve has a smooth outer surface permitting it to be slid into a complementary cylindrical hole through an outer bushing that can be fixed in the box wall, and retained therein by application of a spring snap-ring to the sleeve. Removal of the spring ring permits the sub-assembly to be removed with ease.

A number of advantages flow from this. If the device contained in the box, such as a thermostatic switch, requires removal from the box for servicing, the wires do not have to be removed from the potting compound, and do not require re-potting when the device is replaced. Also much time is saved in assembling operation. Wires do not have to be potted in situ after the boxes have been installed in buildings, an operation that may be awkward. Sleeves can be mounted over wires and the wires potted in an assembly line operation, and then installed into boxes in another assembly line operation. Different numbers and sizes of wires or like elements can be potted into sleeves, and assembled into standard boxes, since the external surfaces of the sleeves are all identical, and the bushings can accept any one of them. Substitute devices can be installed in old boxes without requiring potting at the site.

DESCRIPTION OF THE DRAWINGS

FIG. 1 is a side elevation of the present invention showing the flame-proof box partly in section;

FIG. 2 is an enlarged diametrical section longitudinally through the connector;

FIG. 3 is an end elevation of the connector taken on the line 3—3 of FIG. 2;

FIG. 4 is a diametrical, longitudinal section through the sleeve;

FIG. 5 is an elevation of a two-wire gasket for use with the invention; and

FIG. 6 is an elevation of a four-wire gasket to be used with the invention.

DESCRIPTION OF THE PREFERRED EMBODIMENT

This invention is adapted to be used with a flame-proof box designed to contain such items as thermostats, pressure switches and the like, especially such a box as is set forth in co-pending application of these inventors, Ser. No. 185,319, filed Sept. 30, 1971, for Flame-Proof Thermostat Box.

There is here illustrated a box 10 having a removable cover 11. This box is usually made of some cast material such as cast aluminum and all of the connections into it are made with interfaces sufficiently tight and of sufficient length to prevent transmission of flame between the interior and exterior of the box.

Also illustrated here is a device 12, such as a thermostat, which has wires 13 that must be led to the outside of the box without giving any flame path between the interior and exterior of the box. The unit 12 is subject to servicing requirements, and the fitting here illustrated for carrying the wires through the wall of the box is designed to afford a ready dismantling to permit the wires to be pulled through the wall of the box.

The wall 15 of the box 10 is threaded to receive a bushing 18 having a wrench-receiving portion 20 of hexagon shape in between opposite externally threaded ends 21 and 22. The length of the threaded portions of the bushing and the wall 15 and the closeness of the fit are such that there is no flame path between the interior and exterior of the box 10. The threads 22 are to enable the bushing to be connected to a conventional pipe conduit or the like. The threading 22 is likewise of such length and closeness as to prevent transmission of flame.

The bushing 18 has a smooth cylindrical inner surface 25 extending through it from end to end. It is adapted to receive a sleeve 26 with a smooth cylindrical external surface. The fit of the sleeve 26 into the bushing surface 25 is sufficiently close and long that it does not afford a flame path. The opposite ends of the sleeve 26 are grooved at 27 and 28, the grooves being spaced apart axially a distance slightly greater than the corresponding dimension of the fitting 18. These can receive removable spring retainer rings such as the Spirolox rings shown at 29 and 30. When either ring is removed, the sleeve 26 can be slid through the fitting 18. The sleeve has a generally cylindrical inner surface through it from end to end, except for an inwardly projecting ridge 31 around that surface at the outer end of the sleeve.

The wires 13, which pass through the sleeve 26, are first threaded through an elastomeric gasket 34 having a number of holes 35 corresponding to the number of wires. The wires should have a close fit through the gasket. Typically there will be the two wires as illustrated in FIGS. 2 and 3 which can be accommodated with a two-hole gasket shown in FIG. 5. Other numbers of wires can be accommodated, such as four with a four-hole gasket shown in FIG. 6.

When the wires are fitted through the gasket, they are then threaded through the sleeve 26, and the gasket, which is formed of elastomeric rubber-like material such as Neoprene, is inserted into the end of the sleeve to the position illustrated in FIG. 2. This action is aided by a slight 2° taper on the gasket. Thereupon potting compound is filled into the remainder of the sleeve for substantially the length thereof. The inwardly projecting ridge 31 aids in holding the potting compound within the sleeve, once it has set up.

With the wires and potting compound thus disposed through the sleeve 26, the ring 30 can be placed in position in the groove 28. This gives a sub-assembly of thermostat or other control device, wires, and potted sleeve, with one stop member in the form of the ring 30.

To mount the sub-assembly into the box, the projecting wires are threaded through the bushing 18, followed by the slipping of the sleeve 26 through the cylindrical opening 25 in the bushing 18 until the ring 30 engages the inner end of the bushing. Thereupon, the ring 29 can be snapped into the groove 27 to complete this assembly.

If it becomes necessary to withdraw the wires for servicing of the unit 12 or for any other purpose, it is necessary only to disconnect the wires 13 at their external terminals, to remove the spring ring 29, and to pull the sleeve 26 sub-assembly into the box and out the top opening thereof. If the unit 12 is to be completely replaced, it is necessary only that a sleeve 26 be affixed around the wires of the new unit in the manner indicated, whereupon the new sub-assembly can be slipped into the fitting 18. Alternately, the bushing 18 may be unthreaded for removal of the entire device as a whole. None of these operations requires any twisting of the wires, since the sleeve 26, being cylindrical, can be fitted into the bushing 18 in any angular orientation required by the wires.

The servicing of the unit 12 is thus simplified because it is not necessary to re-pot the wires every time they are withdrawn.

It is evident that this fitting can be used with different sizes of wires by employing an appropriate gasket 34 that has holes in number and size as required. Furthermore, while it has been illustrated in connection with wires 13, it also can be used with other types of elongated elements that must be carried through the wall of the box 10. It has been described in connection with a thermostat, but clearly can be used with other types of devices.

Various changes and modifications may be made within this invention as will be readily apparent to those skilled in the art. Such changes and modifications are within the scope and teaching of this invention as defined by the claims appended hereto.

What is claimed is:

1. A fitting of the kind described to conduct elongated members through a wall without providing flame paths through the wall, comprising an outer bushing having means at one end for connecting it through a wall, and means at the other end for connecting it and securing it to a second receptacle, each of said means comprising an elongated interconnecting construction enabling a fit with said wall or receptacle which is close and long enough to retard flame passage; the bushing having a tubular smooth inner surface; a tubular sleeve to receive the elongated members and conduct them through the wall, the sleeve having an outer surface complementary to the inner surface of the bushing and being slideably engaged in the bushing, the outer dimensions of the sleeve being such that the sleeve can be inserted into either end of the bushing, the surfaces interfitting closely enough and with a length to retard flame; stop means limiting movement of the sleeve into the bushing, and removable means interengaging between the sleeve and bushing releasably to prevent removal of the sleeve from the bushing.

2. The fitting of claim 1, with a gasket of rubber-like material engaged into the end of the sleeve, the gasket having holes to receive the elongated members with a snug fit.

3. The fitting of claim 1, with elongated members extending through the sleeve, and potting compound in the sleeve sealing the elongated members therein.

4. The fitting of claim 1, wherein the interengaging surfaces of the bushing and sleeve are cylindrical to permit free angular orientation of the sleeve in the bushing.

5. The fitting of claim 1, wherein the sleeve projects beyond the bushing, and the removable means interengaging between them comprises a spring ring that can be snapped into place and removed therefrom by resilient distortion.

6. The fitting of claim 1, with a receptacle containing a control device having wires projecting therefrom to be extended outside the receptacle, the receptacle having a wall containing a threaded hole through it, the bushing being externally threaded into the hole to provide the flame-retarding engagement aforesaid; the wires extending through the bushing and the sleeve, and potting compound in the sleeve, surrounding the wires and sealing them to prevent flame passage through the sleeve, the sub-assembly of sleeve, wires and potting compound being installable into and removable from the bushing without disturbing the potting compound.

7. A fitting of the kind described to conduct elongated members through a wall without providing flame paths through the wall, comprising an outer bushing having means at one end for connecting it through a wall, said means enabling a fit with said wall which is close and long enough to retard flame passage; the bushing having a tubular smooth inner surface; a tubular sleeve to receive the elongated members and conduct them through the wall, the sleeve having an outer surface complementary to the inner surface of the bushing and being slideably engaged in the bushing, the maximum outer dimensions of the sleeve being no greater than the internal dimensions of the bushing, so that the sleeve can be inserted into either end of the bushing, the surfaces interfitting closely enough and with a length to retard flame; stop means limiting movement of the sleeve into the bushing, removable means interengaging between the sleeve and bushing releasably to prevent removal of the sleeve from the bushing, and the sleeve having means projecting inwardly from its inner surface to hold potting compound within the sleeve against axial loss from the sleeve.

8. The fitting of claim 7, with a gasket of rubber-like material pressed into one end of the sleeve, the gasket having holes to receive the elongated members, the projecting means comprising a projection extending inwardly from the inner surface of the sleeve at the other end of the sleeve.

* * * * *